(12) United States Patent
Kwon et al.

(10) Patent No.: US 11,928,272 B2
(45) Date of Patent: Mar. 12, 2024

(54) COMPOSITE PANEL

(71) Applicant: DONGWOO FINE-CHEM CO., LTD., Iksan-si (KR)

(72) Inventors: Dohyoung Kwon, Osan-si (KR); Duckkyeom Kim, Hwaseong-si (KR); Ji-yeon Kim, Pyeongtaek-si (KR); Cheol Hun Lee, Pyeongtaek-si (KR); Ki Deok Lee, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/004,583

(22) PCT Filed: Jun. 30, 2021

(86) PCT No.: PCT/KR2021/008253
§ 371 (c)(1),
(2) Date: Jan. 6, 2023

(87) PCT Pub. No.: WO2022/010166
PCT Pub. Date: Jan. 13, 2022

(65) Prior Publication Data
US 2023/0244334 A1    Aug. 3, 2023

(30) Foreign Application Priority Data

Jul. 7, 2020   (KR) .................. 10-2020-0083395

(51) Int. Cl.
*G06F 3/041*       (2006.01)
*B32B 7/12*        (2006.01)
(Continued)

(52) U.S. Cl.
CPC ............... *G06F 3/041* (2013.01); *B32B 7/12* (2013.01); *B32B 27/281* (2013.01);
(Continued)

(58) Field of Classification Search
CPC ..... B32B 27/281; B32B 27/325; B32B 27/36; B32B 7/12; B32B 15/02; B32B 15/20;
(Continued)

(56) References Cited

U.S. PATENT DOCUMENTS

2012/0242610 A1   9/2012  Yasumatsu
2012/0329970 A1*  12/2012 Kishioka ............... B32B 7/12
                                                  526/264
(Continued)

FOREIGN PATENT DOCUMENTS

KR   10-2017-0015021 A   2/2017
KR   10-2018-0099210 A   9/2018
(Continued)

OTHER PUBLICATIONS

International Search Report for PCT/KR2021/008253 dated Sep. 14, 2021.

*Primary Examiner* — Nelson M Rosario
(74) *Attorney, Agent, or Firm* — Sughrue Mion, PLLC

(57) ABSTRACT

A composite panel includes a substrate-less touch sensor panel and a first coupling member coupled to one surface of the touch sensor panel via a first adhesive layer.

12 Claims, 1 Drawing Sheet

(51) Int. Cl.
*B32B 27/28* (2006.01)
*B32B 27/32* (2006.01)
*B32B 27/36* (2006.01)
B32B 15/02 (2006.01)
B32B 15/20 (2006.01)
B32B 27/08 (2006.01)

(52) U.S. Cl.
CPC ............ *B32B 27/325* (2013.01); *B32B 27/36* (2013.01); *B32B 15/02* (2013.01); *B32B 15/20* (2013.01); *B32B 27/08* (2013.01); *B32B 2255/10* (2013.01); *B32B 2255/26* (2013.01); *B32B 2307/412* (2013.01); *B32B 2307/42* (2013.01); *B32B 2307/54* (2013.01); *B32B 2307/7376* (2023.05); *B32B 2457/208* (2013.01); *G06F 2203/04102* (2013.01); *G06F 2203/04103* (2013.01)

(58) Field of Classification Search
CPC ............ B32B 2255/10; B32B 2255/26; B32B 2307/412; B32B 2307/42; B32B 2307/54; B32B 2307/7376; B32B 2457/208; B32B 27/08; C08J 7/04; C08J 7/042; C08J 7/046; G06F 3/041; G06F 2203/04102; G06F 2203/04103
See application file for complete search history.

(56) References Cited

U.S. PATENT DOCUMENTS

| | | | |
|---|---|---|---|
| 2018/0129317 A1* | 5/2018 | Ryu | .................. B32B 17/10 |
| 2018/0136754 A1* | 5/2018 | Kim | .................. G02F 1/13338 |
| 2019/0197282 A1* | 6/2019 | Gong | .................. G02B 5/3025 |
| 2020/0301058 A1* | 9/2020 | Kishi | .................. H05B 33/02 |

FOREIGN PATENT DOCUMENTS

| | | |
|---|---|---|
| KR | 10-2019-0036085 A | 4/2019 |
| KR | 10-2020-0079977 A | 7/2020 |
| WO | 2016/117819 A1 | 7/2016 |

* cited by examiner

【Figure 1】
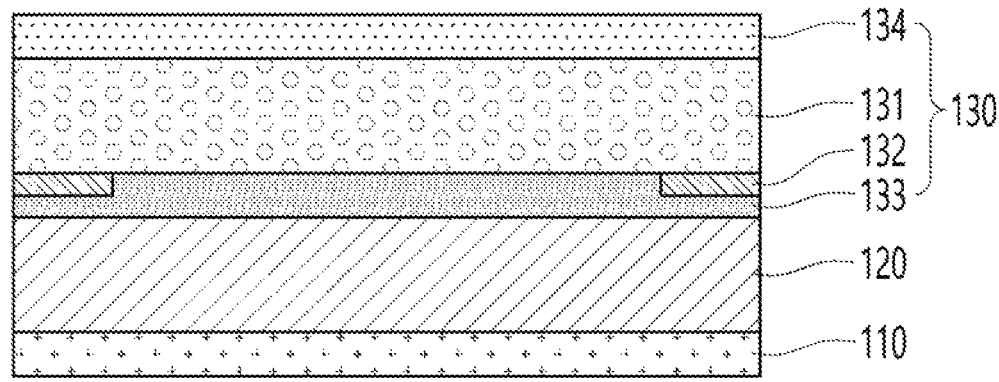
【Figure 2】
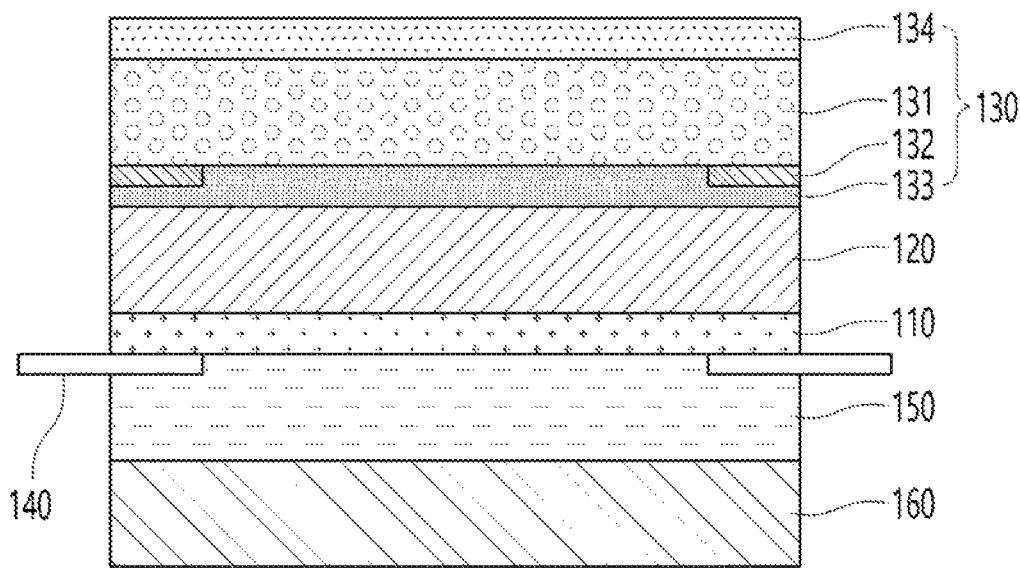

COMPOSITE PANEL

CROSS REFERENCE TO RELATED APPLICATIONS

This is a National Stage of International Application No. PCT/KR2021/008253 filed June 30, 2021, claiming priority based on Korean Patent Application No. 10-2020-0083395 filed Jul. 7, 2020, the contents of all of which are incorporated herein by reference in their entirety.

TECHNICAL FIELD

The present invention relates to a composite panel including a touch sensor panel. Particularly, the present invention relates to a composite panel capable of minimizing the compressive/tensile stress applied to the touch sensor panel.

BACKGROUND ART

A display device may include a display panel for displaying an image, a touch sensor panel for sensing a touch, and so on. The display panel includes a liquid crystal display panel, a plasma display panel, an organic light emitting display panel, an electrophoretic display panel, etc. As for the touch sensor panel, a resistive film type, a capacitive type, an ultrasonic type, an infrared type, etc. are used according to the sensing method of the touch part.

The display device pursues a so-called narrow bezel, which maximizes an effective display area by minimizing a width of a non-display area located outside the display area, that is, a bezel.

International Patent Publication No. WO2016/117819 (hereinafter referred to as 'prior art') discloses a display device having a narrow bezel. The prior art includes a touch sensor panel, a color filter layer, a black matrix layer, and the like. The touch sensor panel includes a window panel in which a printing area is formed outside the display area, a transparent substrate disposed in a lower area of the window panel, a transparent electrode pattern formed in the display area of the transparent substrate, a wiring pattern electrically connected to the transparent electrode pattern and formed on the outside of the display area and inside the outermost part of the display area, a shielding layer formed on the wiring pattern, and the like. Here, the color filter layer is provided in the display area in the lower area of the touch sensor panel. The black matrix layer is formed outside the display area and surrounding the display area.

However, in the prior art, the display device is constructed by stacking the window panel, the touch sensor panel, a decorative panel, a functional layer, a display panel, and the like. When this is used for a foldable device, compressive/tensile stresses of the window panel, decorative panel, functional layer, etc. that are coupled to the upper/lower portions of the touch sensor panel via adhesive layers, etc. may decrease the flexibility of the display device. In addition, the prior art may deteriorate the performance of the touch sensor panel by generating cracks in the touch sensor panel and disconnecting the sensing electrode pattern.

DISCLOSURE OF INVENTION

Technical Problem

An object of the present invention is to prevent or minimize the occurrence of cracks, disconnections, etc. in the touch sensor panel by minimizing the compressive/tensile stress applied to the touch sensor panel when folding the window panel, etc. coupled to the upper and lower portions of the touch sensor panel.

Another object of the present invention is to thin the film.

Yet another object of the present invention is to simplify the process.

Still another object of the present invention is to increase flexibility.

Technical Solution

A composite panel of the present invention to achieve such objects may include a substrate-less touch sensor panel, and a first coupling member coupled to one surface of the touch sensor panel via a first adhesive layer.

The present invention may further include a second coupling member coupled to the other surface of the touch sensor panel via a second adhesive layer.

In the present invention, the first adhesive layer or the second adhesive layer may have a thickness of 10 to 50 μm and a modulus of 0.02 to 1 MPa.

In the present invention, the first adhesive layer or the second adhesive layer may have a modulus of 0.02 to 0.5 MPa.

In the present invention, the first adhesive layer or the second adhesive layer may be a PSA layer or an OCA layer.

In the present invention, the first coupling member may be a window panel.

In the present invention, the window panel may include a transparent film, a hard coating layer coupled to one surface of the transparent film, and a decorative layer coupled to the other surface of the transparent film.

In the present invention, the decorative layer may include a black matrix layer coupled to the other surface of the transparent film, and a planarization layer coupled to the other surface of the transparent film while covering the black matrix layer.

In the present invention, the second coupling member may include at least one of a reinforcing layer and a functional layer.

In the present invention, the reinforcing layer may be a PET layer, a PI layer, or a COP layer.

In the present invention, the functional layer may be a polarization layer.

In the present invention, the second coupling member may be a display panel.

Advantageous Effects

The present invention combines a window panel, a functional layer, etc. on the upper/lower part of the touch sensor panel via an adhesive layer with the modulus of 0.02 to 0.5 MPa, thereby minimizing the compressive/tensile stress applied to the touch sensor panel by the window panel, the functional layer, etc. during folding. Through this, the present invention can prevent or minimize the occurrence of cracks, disconnections, etc. in the touch sensor panel.

The present invention can minimize the thickness of the touch sensor panel by removing the substrate (or substrate film) from the touch sensor panel. Through this, the present invention can thin the composite panel. The present invention can increase the flexibility of the composite panel.

The present invention can simplify the process by configuring the window panel (hard coating layer, transparent film, and decorative layer) and the touch sensor panel integrally, and can achieve better thinness and flexibility.

The present invention can simplify the process by using an adhesive layer when bonding the window panel, the functional layer, etc. to the touch sensor panel. Through this, the present invention may make the manufacturing easy and lower the manufacturing cost.

DESCRIPTION OF DRAWINGS

FIG. 1 is a cross-sectional view illustrating a composite panel according to an embodiment of the present invention.

FIG. 2 is a cross-sectional view illustrating a composite panel according to another embodiment of the present invention.

BEST MODE

Hereinafter, the present invention will be described in more detail with reference to the drawings.

FIG. 1 is a cross-sectional view illustrating a composite panel according to an embodiment of the present invention.

As shown in FIG. 1, the composite panel according to the present invention may include a touch sensor panel 110, and a first adhesive layer 120 and a first coupling member 130 stacked on one surface (upper surface in FIG. 1) of the touch sensor panel 110.

The touch sensor panel 110 senses a touch and may include a base layer, an electrode pattern layer, a passivation layer, and the like.

The base layer is a base of the electrode pattern layer, and may be composed of, for example, a cyclo-olefin polymer (COP), polycarbonate, polyethylene terephthalate (PET), polymethyl methacrylate, polyimide, polyethylene naphthalate, polyether sulfone, etc.

The base layer may be composed of a separation layer and a protective layer by manufacturing the touch sensor panel by a transfer method.

The separation layer may be composed of an organic polymer film, which may be composed of one or more selected from a group consisting of a polyimide, polyvinyl alcohol, polyamic acid, polyamide, polyethylene, polystyrene, polynorbornene, phenylmaleimide copolymer, polyazobenzene, polyphenylenephthalamide, polyester, polymethyl methacrylate, polyarylate, cinnamate-based polymer, coumarin-based polymer, phthalimidine-based polymer, chalcone-based polymer, and aromatic acetylene-based polymer.

The protective layer protects the electrode pattern layer against contact or impact from the outside, and may reinforce the function of the separation layer. The protective layer includes at least one of an organic insulation layer and an inorganic insulation layer, and may be formed through coating/curing or deposition.

The electrode pattern layer senses a touch, and may be formed of a transparent conductive layer, for example, a conductive metal, metal nanowire, a metal oxide, carbon nanotube, graphene, a conductive polymer, a conductive ink, or the like.

Metal nanowires consist of a conductive metal in the form of nano-unit wires, and may be, for example, silver (Ag), gold (Au), copper (Cu), nickel (Ni), platinum (Pt), palladium (Pd), or aluminum (Al) nanowires, or may be core-shell wires with a combination thereof. The nanowires can be connected to each other to act as electrodes. Nanowires can be transparent due to their nano-sized dimension.

As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide(IZTO-Ag-IZTO), aluminum zinc oxide-silver-aluminum zinc oxide (AZO-Ag-AZO), etc. may be used.

When the electrode pattern layer is used for foldable devices, it may be preferable to be formed of a soft conductive material. As the soft conductive material, polyethylenedioxythiophene (PEDOT: poly 3,4-ethylenedioxythiophene), PEDOT:PSS (polystyrene sulfonate), or a mixture of PEDOT:PSS and metal nanowires may be used.

PEDOT:PSS is a polythiophene-based conductive polymer, which is poly(3,4-ethylenedioxythiophene) doped with polystyrene sulfonate (PSS). PEDOT:PSS can be prepared by oxidative polymerization of 3,4-ethylenedioxythiophene (EDOT) in an aqueous solution using PSS as a template for balancing charge. PEDOT:PSS allows PEDOT to be ionic bonded very strongly to the PSS polymer chain. As a result, PEDOT:PSS is not separated from each other in an aqueous solution and can be stably dispersed as polymer gel particles.

The passivation layer insulates and protects the electrode pattern layer, and may be formed on the electrode pattern layer and the base layer. The passivation layer may be composed of one or more materials selected from a curable prepolymer, a curable polymer, and a plastic polymer, which are general insulators.

The passivation layer may be made of a varnish-type material capable of forming a film. The varnish-type material may be polysilicon, such as polydimethylsiloxane (PDMS) or polyorganosiloxane (POS), polyimide, or polyurethane, such as spandex. The varnish-type material is a soft insulation material and can increase the stretchability and dynamic folding capability of the touch sensor panel.

The touch sensor panel 110 may be configured as a thin film layer having a thickness of, for example, 4 to 10 μm by not bonding a separate substrate other than the base layer (meaning all members such as films and glasses that are additionally attached to the touch sensor layer other than the base layer described above) to the touch sensor panel 110.

For thinning, both the base layer and the passivation layer in the touch sensor panel 110 may be formed as the first and second adhesive layers 120 and 150, or only the passivation layer may be formed as the first adhesive layer 120.

The first adhesive layer 120 is to couple the touch sensor panel 110 and the first coupling member 130, one surface (lower surface in FIG. 1) of which may be coupled to one surface (upper surface in FIG. 1) of the touch sensor panel 110, and the other surface (upper surface in FIG. 1) of which may be coupled to one surface (lower surface in FIG. 1) of the first coupling member 130.

As the first adhesive layer 120, an adhesive film such as a pressure sensitive adhesive (PSA) or an optically clear adhesive (OCA) may be used.

The first adhesive layer 120 may include an acrylic copolymer, a crosslinking agent, and the like.

The acrylic copolymer may be a copolymer of a (meth) acrylate monomer having an alkyl group having 1 to 12 carbon atoms and a polymerizable monomer having a crosslinkable functional group. (Meth)acrylate means acrylate and methacrylate. The polymerizable monomer having a crosslinkable functional group is a component for providing durability and cutting properties by reinforcing the cohesive force or adhesive strength of the adhesive composition by chemical bonding. Examples include a monomer having a hydroxyl group, and a monomer having a carboxy group, and these may be used individually or in a mixture of two or more thereof.

The crosslinking agent is a component capable of improving adhesion and durability and maintaining reliability and shape of the adhesive at high temperatures. Examples include isocyanate-based, epoxy-based, peroxide-based, metal chelate-based, oxazoline-based, etc., and these may be used individually or in a mixture of two or more thereof. Among them, an isocyanate-based may be preferable.

Table 1 below shows whether cracks occur when folding at 1.5R and 3R as the thickness and modulus of the first adhesive layer 120 made of PSA change. The thickness of the touch sensor panel 110 is 4 μm. If a crack occurs in the electrode pattern layer, it is indicated by 'O', if not, it is indicated by 'x'.

TABLE 1

| Experimental example | Thickness of first adhesive layer (μm) | Modulus of first adhesive layer at room temperature (MPa) | Crack occurrence in touch sensor panel | |
|---|---|---|---|---|
| | | | 1.5R | 3R |
| 1 | 10 | 0.02 | x | x |
| 2 | | 0.23 | x | x |
| 3 | | 0.50 | x | x |
| 4 | | 0.71 | o | x |
| 5 | | 1.00 | o | x |
| 6 | 20 | 0.07 | x | x |
| 7 | | 0.28 | x | x |
| 8 | | 0.54 | x | x |
| 9 | | 1.01 | o | x |
| 10 | | 1.21 | o | o |
| 11 | 30 | 0.12 | x | x |
| 12 | | 0.52 | x | x |
| 13 | | 1.03 | o | x |
| 14 | | 1.35 | o | o |
| 15 | | 1.94 | o | o |
| 16 | 40 | 0.15 | x | x |
| 17 | | 0.51 | x | x |
| 18 | | 1.02 | o | x |
| 19 | | 1.42 | o | o |
| 20 | | 2.03 | o | o |
| 21 | 50 | 0.24 | x | x |
| 22 | | 0.53 | x | x |
| 23 | | 1.05 | o | x |
| 24 | | 1.58 | o | o |
| 25 | | 2.45 | o | o |

Table 2 below shows the experimental results in the same manner as in Table 1 above, with the thickness of the touch sensor panel 110 being 7 μm.

TABLE 2

| Experimental example | Thickness of first adhesive layer (μm) | Modulus of first adhesive layer at room temperature (MPa) | Crack occurrence in touch sensor panel | |
|---|---|---|---|---|
| | | | 1.5R | 3R |
| 26 | 10 | 0.02 | x | x |
| 27 | | 0.23 | x | x |
| 28 | | 0.50 | x | x |
| 29 | | 0.71 | o | x |
| 30 | | 1.00 | o | x |
| 31 | 20 | 0.07 | x | x |
| 32 | | 0.28 | x | x |
| 33 | | 0.54 | x | x |
| 34 | | 1.01 | o | x |
| 35 | | 1.21 | o | o |
| 36 | 30 | 0.12 | x | x |
| 37 | | 0.52 | x | x |
| 38 | | 1.03 | o | x |
| 39 | | 1.35 | o | o |
| 40 | | 1.94 | o | o |
| 41 | 40 | 0.15 | x | x |
| 42 | | 0.51 | x | x |
| 43 | | 1.02 | o | x |
| 44 | | 1.42 | o | o |
| 45 | | 2.03 | o | o |
| 46 | 50 | 0.24 | x | x |
| 47 | | 0.53 | x | x |
| 48 | | 1.05 | o | x |
| 49 | | 1.58 | o | o |
| 50 | | 2.45 | o | o |

Table 3 below shows the experimental results in the same manner as in Table 1 above, with the thickness of the touch sensor panel 110 being 10 μm.

TABLE 3

| Experimental example | Thickness of first adhesive layer (μm) | Modulus of first adhesive layer at room temperature (MPa) | Crack occurrence in touch sensor panel | |
|---|---|---|---|---|
| | | | 1.5R | 3R |
| 51 | 10 | 0.02 | x | x |
| 52 | | 0.23 | x | x |
| 53 | | 0.50 | x | x |
| 54 | | 0.71 | o | x |
| 55 | | 1.00 | o | x |
| 56 | 20 | 0.07 | x | x |
| 57 | | 0.28 | x | x |
| 58 | | 0.54 | x | x |
| 59 | | 1.01 | o | x |
| 60 | | 1.21 | o | o |
| 61 | 30 | 0.12 | x | x |
| 62 | | 0.52 | x | x |
| 63 | | 1.03 | o | x |
| 64 | | 1.35 | o | o |
| 65 | | 1.94 | o | o |
| 66 | 40 | 0.15 | x | x |
| 67 | | 0.51 | x | x |
| 68 | | 1.02 | o | x |
| 69 | | 1.42 | o | o |
| 60 | | 2.03 | o | o |
| 71 | 50 | 0.24 | x | x |
| 72 | | 0.53 | x | x |
| 73 | | 1.05 | o | x |
| 74 | | 1.58 | o | o |
| 75 | | 2.45 | o | o |

As shown in Tables 1 to 3 above, it can be confirmed that the crack occurrence in the touch sensor panel 110 is not related to the thickness of the touch sensor panel 110 but is related to the modulus of the first adhesive layer 120. That is, when the thickness of the first adhesive layer 120 is configured to be in the range of 10 to 50 μm for thinning, in order not to generate cracks in the touch sensor panel 110 during folding, the modulus of the first adhesive layer 120 should be 0.02 to 1.00 MPa in the 3R folding condition and 0.02 to 0.50 MPa in the 1.5R folding condition. Here, when the modulus of the first adhesive layer 120 is less than 0.02 MPa, it is difficult to apply the first adhesive layer 120 to the process. Accordingly, the modulus of the first adhesive layer 120 is limited to 0.02 MPa or more.

The first coupling member 130 is coupled to the touch sensor panel 110 via the first adhesive layer 120, and it may be a window panel. The window panel, as shown in FIG. 1, may include a transparent film 131, decorative layers 132 and 133, a hard coating layer 134, and the like.

The transparent film 131 may be a PI film, a PET film, a COP film, or the like. The transparent film 131 may have a thickness of 20 to 50 μm.

The decorative layers 132 and 133 are coupled to one surface (lower surface in FIG. 1) of the transparent film 131, and may include a black matrix layer 132 and a planarization layer 133.

The black matrix layer 132 is coupled to the edge region, that is, the bezel region of one surface (lower surface in FIG. 1) of the transparent film 131 to block light, which may be composed of a black resin composition of a single thin film. As the black resin composition, a composition including a resin with black pigment particles dispersed, a composition including a binder resin, a polymerizable compound, a polymerization initiator, and an additive, or a photocurable (thermosetting) resin composition including a black pigment to exhibit black color may be used.

The black pigment may be carbon black, graphite, metal oxide, or the like. The black pigment may include an organic black pigment, and the organic black pigment may be aniline black, lactam black, or perylene black series.

The additive may include an adhesion promoter, a photocrosslinking sensitizer, a curing accelerator, a surfactant, a dispersant, an antioxidant, an ultraviolet absorber, a thermal polymerization inhibitor, a leveling agent, and the like, and may include one or more of these.

The black matrix layer 132 may be formed by a photolithography process for thinning In the photolithography process, the photosensitive black resin composition may be applied to the transparent film 131 and then the photosensitive black resin composition may be exposed and developed.

The planarization layer 133 is coupled to one surface (lower surface in FIG. 1) of the transparent film 131 while covering the black matrix layer 132 to perform functions such as surface step correction, planarization, transparent film protection, and refractive index control, which may be a so-called overcoating layer. The planarization layer 133 may have a thickness of 1.5 to 5 μm.

The planarization layer 133 may be formed of an organic film, or may be formed of an inorganic film or an organic-inorganic hybrid film. As the organic layer, polyacrylate, polyimide, polyester, or the like may be used. As the inorganic film, silazane, silica, or an inorganic film or metal film having light transmittance guaranteed may be used. The inorganic film may contain inorganic fillers. The inorganic filler may be spherical nanoparticles capable of improving light extraction efficiency. The organic-inorganic hybrid film may use a dispersed organic-inorganic hybrid composite such as siloxane or silsesquioxane.

In FIG. 1, the planarization layer 133 may be replaced with the first adhesive layer 120.

The hard coating layer 134 is coupled to the other surface (upper surface in FIG. 1) of the transparent film 131 to protect the other surface of the transparent film 131, which may be configured by using a transparent polymer film or by coating a transparent polymer material.

As the transparent polymer material, triacetyl cellulose, acetyl cellulose butyrate, ethylene-vinyl acetate copolymer, propionyl cellulose, butyryl cellulose, acetyl propionyl cellulose, polyester, polystyrene, polyamide, polyetherimide, polyacrylic, polyimide, polyethersulfone, polysulfone, polyethylene, polypropylene, polymethylpentene, polyvinyl chloride, polyvinylidene chloride, polyvinyl alcohol, polyvinyl acetal, polyether ketone, polyether ether ketone, polyether sulfone, polymethyl methacrylate, polyethylene terephthalate, polybutylene terephthalate, polyethylene naphthalate, polycarbonate may be used individually or in a mixture of two or more thereof.

As the coating method, a bar coating method, a knife coating method, a roll coating method, a blade coating method, a die coating method, a micro gravure coating method, a comma coating method, a slot die coating method, a lip coating method, a solution casting method, or the like may be used.

FIG. 2 is a cross-sectional view illustrating a composite panel according to another embodiment of the present invention.

As shown in FIG. 2, the composite panel according to another embodiment may have a structure in which an FPCB 140, a second adhesive layer 150, and a second coupling member 160 are additionally stacked on the other surface (lower surface in FIG. 2) of the touch sensor panel 110.

The FPCB 140 transmits a sensing signal of the touch sensor panel 110 to the outside, and one side of which may be adhered to an electrode pad of the touch sensor panel 110 using an adhesive including a photocurable resin. As the adhesive, an anisotropic conductive film (ACF) having a plurality of conductive balls may be used. In FIG. 2, the FPCB 140 is shown to be coupled to the lower surface of the touch sensor panel 110, but it is also possible to couple the FPCB 140 to the upper surface of the touch sensor panel 110.

The second adhesive layer 150 is to couple the touch sensor panel 110 and the second coupling member 160, and one surface (upper surface in FIG. 2) of which is coupled to the other surface (lower surface in FIG. 2) of the touch sensor panel 110, and the other surface (lower surface in FIG. 2) of which may be coupled to one surface (upper surface in FIG. 2) of the second coupling member 160.

The second adhesive layer 150 may use an adhesive film such as PSA (pressure sensitive adhesive), OCA (optically clear adhesive), etc. For a detailed description of these, see the related description of the first adhesive layer 120 described above.

Table 4 below shows whether cracks occur when folding at 1.5R and 3R as the thickness and modulus of the second adhesive layer 150 made of PSA change. The thickness of the touch sensor panel 110 is 7 μm. The first adhesive layer 120 is made of the same PSA as the second adhesive layer 150. The thickness and modulus of the first adhesive layer 120 are 10 μm and 0.02 MPa, respectively. If a crack occurs in the electrode pattern layer, it is indicated by 'O', if not, it is indicated by 'x'.

TABLE 4

| Experimental example | Thickness of second adhesive layer (μm) | Modulus of second adhesive layer at room temperature (MPa) | Crack occurrence in touch sensor panel | |
|---|---|---|---|---|
| | | | 1.5R | 3R |
| 76 | 10 | 0.02 | x | x |
| 77 | | 0.23 | x | x |
| 78 | | 0.50 | x | x |
| 79 | | 0.71 | o | x |
| 80 | | 1.00 | o | x |
| 81 | 20 | 0.07 | x | x |
| 82 | | 0.28 | x | x |
| 83 | | 0.54 | x | x |
| 84 | | 1.01 | o | x |
| 85 | | 1.21 | o | o |
| 86 | 30 | 0.12 | x | x |
| 87 | | 0.52 | x | x |
| 88 | | 1.03 | o | x |
| 89 | | 1.35 | o | o |
| 90 | | 1.94 | o | o |

TABLE 4-continued

| Experimental example | Thickness of second adhesive layer (μm) | Modulus of second adhesive layer at room temperature (MPa) | Crack occurrence in touch sensor panel | |
|---|---|---|---|---|
| | | | 1.5R | 3R |
| 91 | 40 | 0.15 | x | x |
| 92 | | 0.51 | x | x |
| 93 | | 1.02 | ○ | x |
| 94 | | 1.42 | ○ | ○ |
| 95 | | 2.03 | ○ | ○ |
| 96 | 50 | 0.24 | x | x |
| 97 | | 0.53 | x | x |
| 98 | | 1.05 | ○ | x |
| 99 | | 1.58 | ○ | ○ |
| 100 | | 2.45 | ○ | ○ |

Table 5 below shows whether cracks occur when folding at 1.5R and 3R as the thickness and modulus of the second adhesive layer 150 made of PSA change. The thickness of the touch sensor panel 110 is 7 μm. The first adhesive layer 120 is made of the same PSA as the second adhesive layer 150. The thickness and modulus of the first adhesive layer 120 are 50 μm and 0.5 MPa, respectively. If a crack occurs in the electrode pattern layer, it is indicated by '○', if not, it is indicated by 'x'.

TABLE 5

| Experimental example | Thickness of second adhesive layer (μm) | Modulus of second adhesive layer at room temperature (MPa) | Crack occurrence in touch sensor panel | |
|---|---|---|---|---|
| | | | 1.5R | 3R |
| 101 | 10 | 0.02 | x | x |
| 102 | | 0.23 | x | x |
| 103 | | 0.50 | x | x |
| 104 | | 0.71 | ○ | x |
| 105 | | 1.00 | ○ | x |
| 106 | 20 | 0.07 | x | x |
| 107 | | 0.28 | x | x |
| 108 | | 0.54 | x | x |
| 109 | | 1.01 | ○ | x |
| 110 | | 1.21 | ○ | ○ |
| 111 | 30 | 0.12 | x | x |
| 112 | | 0.52 | x | x |
| 113 | | 1.03 | ○ | x |
| 114 | | 1.35 | ○ | ○ |
| 115 | | 1.94 | ○ | ○ |
| 116 | 40 | 0.15 | x | x |
| 117 | | 0.51 | x | x |
| 118 | | 1.02 | ○ | x |
| 119 | | 1.42 | ○ | ○ |
| 120 | | 2.03 | ○ | ○ |
| 121 | 50 | 0.24 | x | x |
| 122 | | 0.53 | x | x |
| 123 | | 1.05 | ○ | x |
| 124 | | 1.58 | ○ | ○ |
| 125 | | 2.45 | ○ | ○ |

Table 6 below shows whether cracks occur when folding at 1.5R and 3R as the thickness and modulus of the second adhesive layer 150 made of PSA change. The thickness of the touch sensor panel 110 is 7 μm. The first adhesive layer 120 is made of the same PSA as the second adhesive layer 150. The thickness and modulus of the first adhesive layer 120 are 50 μm and 1.00 MPa, respectively. If a crack occurs in the electrode pattern layer, it is indicated by '○', if not, it is indicated by 'x'.

TABLE 6

| Experimental example | Thickness of second adhesive layer (μm) | Modulus of second adhesive layer at room temperature (MPa) | Crack occurrence in touch sensor panel | |
|---|---|---|---|---|
| | | | 1.5R | 3R |
| 126 | 10 | 0.02 | x | x |
| 127 | | 0.23 | x | x |
| 128 | | 0.50 | x | x |
| 129 | | 0.71 | ○ | x |
| 130 | | 1.00 | ○ | x |
| 131 | 20 | 0.07 | x | x |
| 132 | | 0.28 | x | x |
| 133 | | 0.54 | x | x |
| 134 | | 1.01 | ○ | x |
| 135 | | 1.21 | ○ | ○ |
| 136 | 30 | 0.12 | x | x |
| 137 | | 0.52 | x | x |
| 138 | | 1.03 | ○ | x |
| 139 | | 1.35 | ○ | ○ |
| 140 | | 1.94 | ○ | ○ |
| 141 | 40 | 0.15 | x | x |
| 142 | | 0.51 | x | x |
| 143 | | 1.02 | ○ | x |
| 144 | | 1.42 | ○ | ○ |
| 145 | | 2.03 | ○ | ○ |
| 146 | 50 | 0.24 | x | x |
| 147 | | 0.53 | x | x |
| 148 | | 1.05 | ○ | x |
| 149 | | 1.58 | ○ | ○ |
| 150 | | 2.45 | ○ | ○ |

As shown in Tables 4 to 6 above, in the structure where the first and second adhesive layers 120 and 150 are combined on both sides of the touch sensor panel 110, when the thickness of the first and second adhesive layers 120 and 150 is 10 to 50 μm, in order not to generate cracks in the touch sensor panel 110 during folding, the modulus of the second adhesive layer 150 should be 0.02 to 1.00 MPa in the 3R folding condition and 0.02 to 0.50 MPa in the 1.5R folding condition, same as those of the first adhesive layer 120.

The second coupling member 160 may be a reinforcing layer, a functional layer, a display panel, or the like.

The reinforcing layer may be a PET layer, a PI layer, a COP layer, etc., the functional layer may be a polarizing layer, etc., and the display panel may be a liquid crystal display panel, a plasma panel, an electroluminescent panel, an organic light emitting diode panel, or the like.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

[Description of reference numerals]

| | |
|---|---|
| 110: touch sensor panel | 120: first adhesive layer |
| 130: first coupling member | 131: transparent film |
| 132: black matrix layer | 133: planarization layer |
| 134: hard coating layer | 140: FPCB |
| 150: second adhesive layer | 160: second coupling member |

The invention claimed is:

1. A composite panel comprising: a substrate-less touch sensor panel; and a first coupling member coupled to one surface of the touch sensor panel via a first adhesive layer, wherein the first coupling member is a window panel, and wherein the window panel includes: a transparent film; a hard coating layer coupled to one surface of the transparent film; and a decorative layer coupled to the other surface of the transparent film, wherein the decorative layer includes: a black matrix layer coupled to the other surface of the transparent film; and a planarization layer coupled to the other surface of the transparent film while covering the black matrix layer.

2. The composite panel according to claim 1, further comprising a second coupling member coupled to the other surface of the touch sensor panel via a second adhesive layer.

3. The composite panel according to claim 2, wherein the second coupling member includes at least one of a reinforcing layer or a functional layer.

4. The composite panel according to claim 3, wherein the reinforcing layer is a PET layer, a PI layer, or a COP layer.

5. The composite panel according to claim 3, wherein the functional layer is a polarization layer.

6. The composite panel according to claim 2, wherein the second coupling member is a display panel.

7. The composite panel according to claim 2, wherein the second adhesive layer has a thickness of 10 to 50 pm and a modulus of 0.02 to 1 MPa.

8. The composite panel according to claim 7, wherein the second adhesive layer has a modulus of 0.02 to 0.5 MPa.

9. The composite panel according to claim 8, wherein the second adhesive layer is a pressure sensitive adhesive (PSA) layer or an optically clear adhesive (OCA) layer.

10. The composite panel according to claim 1, wherein the first adhesive layer has a thickness of 10 to 50 pm and a modulus of 0.02 to 1 MPa.

11. The composite panel according to claim 10, wherein the first adhesive layer has a modulus of 0.02 to 0.5 MPa.

12. The composite panel according to claim 11, wherein the first adhesive layer is a pressure sensitive adhesive (PSA) layer or an optically clear adhesive (OCA) layer.

\* \* \* \* \*